F. & N. M. SPRANGER.
DEMOUNTABLE RIM.
APPLICATION FILED MAR. 25, 1918.
1,276,985.
Patented Aug. 27, 1918.
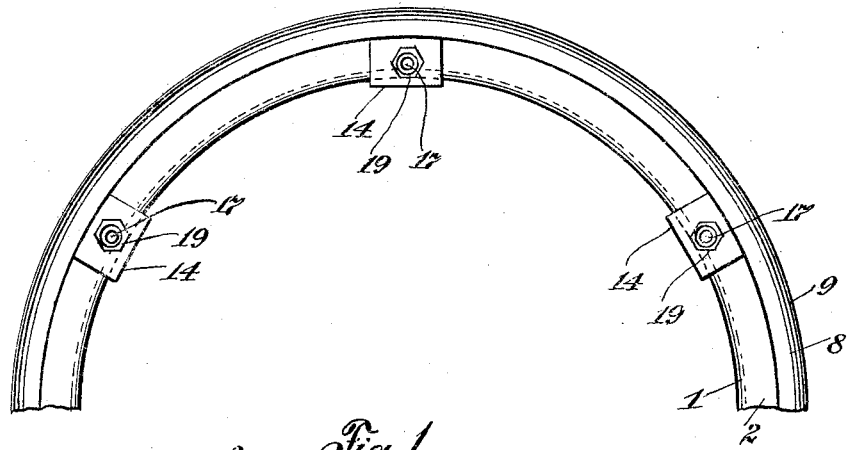
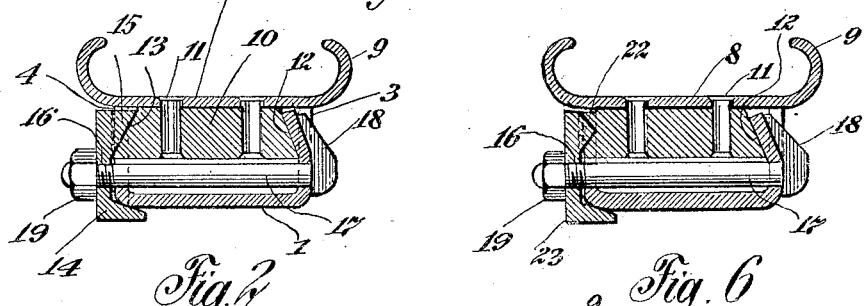
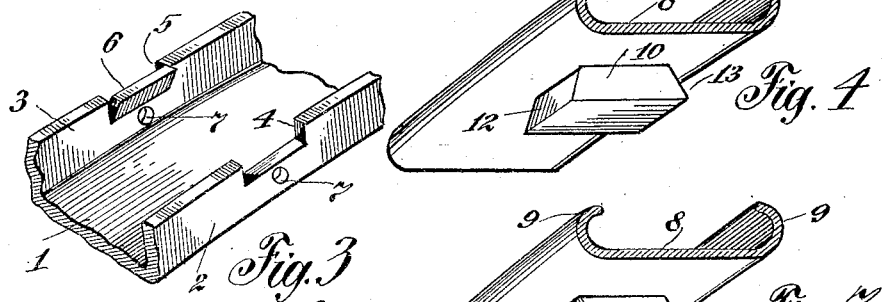
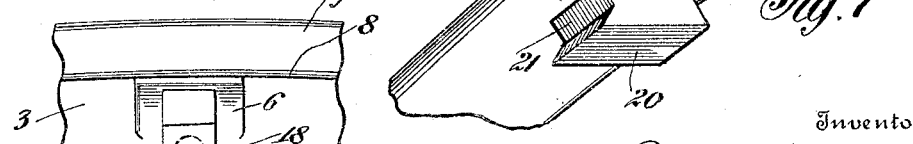
Inventors
Frank Spranger.
Nicholas M. Spranger.
By
Attorneys
Witness
Charles Belg
Karl H. Butler

UNITED STATES PATENT OFFICE.

FRANK SPRANGER AND NICHOLAS M. SPRANGER, OF DETROIT, MICHIGAN.

DEMOUNTABLE RIM.

1,276,985. Specification of Letters Patent. Patented Aug. 27, 1918.

Application filed March 25, 1918. Serial No. 224,625.

*To all whom it may concern:*

Be it known that we, FRANK SPRANGER and NICHOLAS M. SPRANGER, citizens of the United States of America, residing at Detroit, in the county of Wayne and State of Michigan, have invented certain new and useful Improvements in Demountable Rims, of which the following is a specification, reference being had therein to the accompanying drawings.

Our invention aims to provide simple and effective means for connecting a demountable rim to a fixed rim or felly of a wheel, so that the demountable rim may be easily and quickly removed when it is desired to substitute a spare rim and its tire for a demountable rim having a deflated or injured tire.

Our invention further aims to provide fastening means for a demountable rim which will prevent the demountable rim from creeping or shifting circumferentially of the fixed rim or felly of a wheel, also hold and secure the demountable rim against lateral displacement and at the same time clamp the demountable rim on the fixed rim or felly of the wheel so that for all operating or practical purposes, it will be as though integral or a permanent part of the wheel.

Our invention will be hereinafter described and then claimed, and reference will now be had to the drawing, wherein—

Figure 1 is a side elevation of a portion of a demountable rim in accordance with our invention;

Fig. 2 is a cross sectional view of the same;

Fig. 3 is a perspective view of a portion of the fixed rim of a wheel;

Fig. 4 is a perspective view of a portion of the demountable rim;

Fig. 5 is a view of the inner side of a portion of the rims;

Fig. 6 is a cross sectional view illustrating a slight modification of our invention, and Fig. 7 is a perspective view of a portion of the demountable rim in accordance with the modification.

In the drawing, the reference numeral 1 denotes a channel shaped fixed rim adapted to be supported by wire or wooden spokes according to the type of wheel provided with a demountable rim in accordance with our invention. The fixed channel rim 1 has an outer flange 2 and an inner flange 3, said flanges being circumferentially of the rim and providing a channel for the rim. The flanges 2 and 3, at intervals throughout the circumference of the fixed rim, have transversely alining notches 4 and 5 with the material completely removed from the notch 4 and the material stamped from the notch 5 bent inwardly so as to form an angularly disposed lip 6.

The flanges 2 and 3, below the notches 4 and 5, have transversely alining bolt openings 7, and the shape of the notches 4 and 5 is such as to provide end abutments.

8 denotes a demountable rim having the usual turned or clencher edges 9. The demountable rim 8 is adapted to slide on to the fixed rim 1, from the outer side thereof and rest on the edges of the flanges 2 and 3 of said fixed rim.

10 denotes blocks carried by the demountable rim 8 and at intervals throughout the circumference thereof, the distance between said blocks corresponding to the distance between the notches of each flange of the fixed rim. The blocks 10 may be riveted to the demountable rim, as at 11, or may be spot welded or otherwise secured so as to be positively fixed relative to said demountable rim. The blocks 10 correspond in width to the length of the notches 4 and 5 and said blocks have beveled side edges 12 and 13, the former to engage the lips 6 of the flange 3 and thereby limit the inward movement of the blocks 10 into the channel fixed rim, thus providing for the proper position of the demountable rim on the fixed rim. By reference to Fig. 2, it will be observed that the outer side edges 13 of the blocks 10 extend into the notches 4 and engage the end walls or abutments thereof, thus preventing the demountable rim from creeping or shifting circumferentially of the fixed rim.

14 denotes angle clips adapted to engage under the fixed rim, said angle clips having beveled projections 15 adapted to extend into the notches 4 and engage the beveled edges 13 of the blocks 10, said beveled projections filling the notches 4. The angle clips 14 are provided with openings 16 to aline with the openings 7 of the flanges 2 and 3, so that all of said openings may receive bolts 17 that extend transversely of the fixed channel rim, between said rim and the blocks 10. The bolts 17 have anchor heads 18 that engage the flange 3, extend into the notches 5 and engage the lips 6 as best shown in Fig. 2. On the opposite ends of the bolts are nuts 19 and by tightening said nuts, the angle clips 14 may be clamped in engagement with the fixed rim to positively hold the blocks 10 within said fixed rim.

Figs. 6 and 7 show a modification of our invention, wherein demountable rim blocks 20 have the outer side edges thereof provided with V-shaped seats 21 to receive V-shaped projections 22 on angle clips 23, otherwise the construction of the modification is similar to the preferred form.

While in the drawings there are illustrated the preferred embodiments of our invention, it is to be understood that the structural elements are susceptible to such modifications and variations as fall within the scope of the appended claims.

What we claim is:—

1. In a demountable rim, the combination of a fixed channel rim having side flanges provided with notches and the material from the notch of the inner flange struck inwardly to provide lips, a demountable rim adapted to fit on the flanges of said fixed rim, blocks carried thereby adapted to abut the lips of the inner flange of said fixed rim, and extend into the notches of the outer flange of said fixed rim, clips adapted to engage the outer flange of said fixed rim and extend into the notches thereof and engage said blocks, bolts extending through the flanges of said fixed rim and having heads extending into the notches of the inner flange of said fixed rim to engage the lips thereof, and nuts screwed upon said bolts holding said angle clips in engagement with said fixed rim.

2. In a demountable rim, the combination of a fixed channel rim having flanges provided with notches, lips carried by one of the flanges of said fixed rim at the notches thereof, a demountable rim adapted to fit on said fixed rim, blocks carried thereby adapted to extend into the channel of said fixed rim and engage the lips thereof, clips against said fixed rim adapted to extend into notches thereof and engage said blocks, and bolts in said fixed rim under said blocks and adapted for holding said lips in engagement with said fixed rim.

3. In a demountable rim, the combination with a fixed channel rim having flanges provided with notches and lips at some of said notches, a demountable rim adapted to fit on the flanges of said fixed rim, blocks carried thereby and adapted to engage in the notches of one flange and engage the lips of the other flange of said fixed rim, angle clips against said fixed rim extending into notches thereof and engaging the blocks of said demountable rim, and means extending between said blocks and said fixed rim and engaging said lips and said angle clips adapted for holding said blocks in said fixed rim.

In testimony whereof we affix our signatures in presence of two witnesses.

FRANK SPRANGER.
NICHOLAS M. SPRANGER.

Witnesses:
ANNA M. DORR,
LEWIS E. FLANDERS.

Copies of this patent may be obtained for five cents each, by addressing the "Commissioner of Patents, Washington, D. C."